May 4, 1965  J. RUDELICK  3,181,564
CONTROL VALVE FOR WATER SOFTENERS
Filed Nov. 1, 1962  6 Sheets-Sheet 2
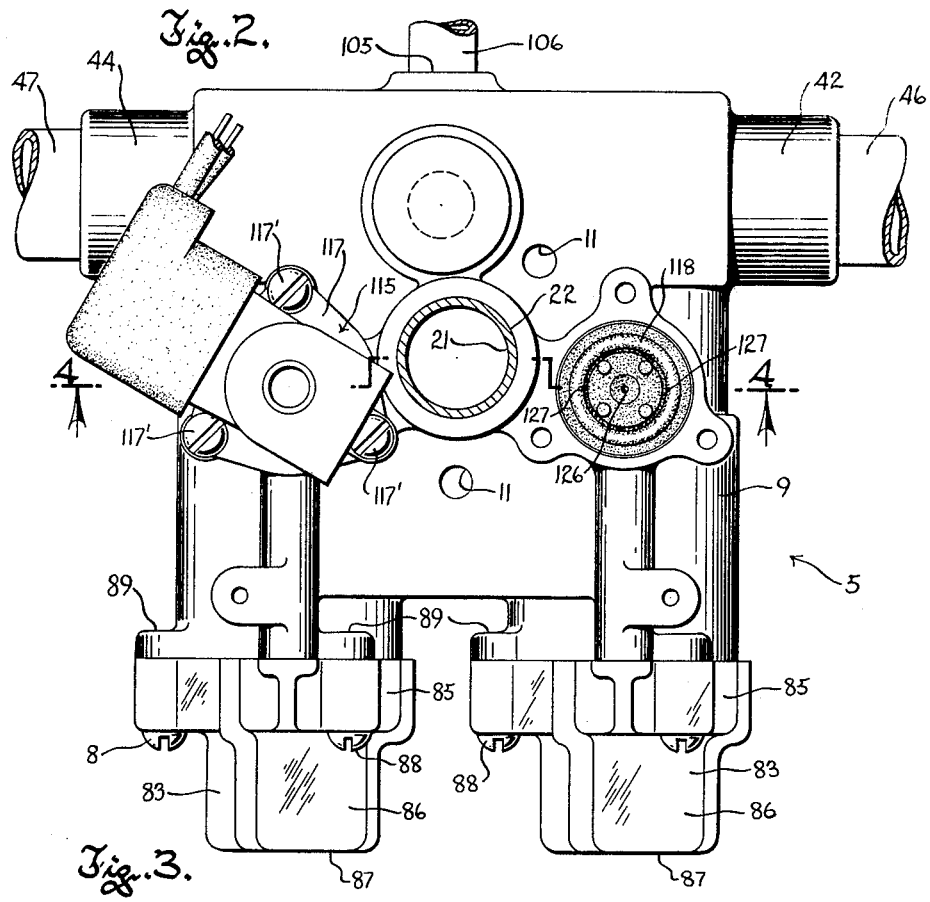
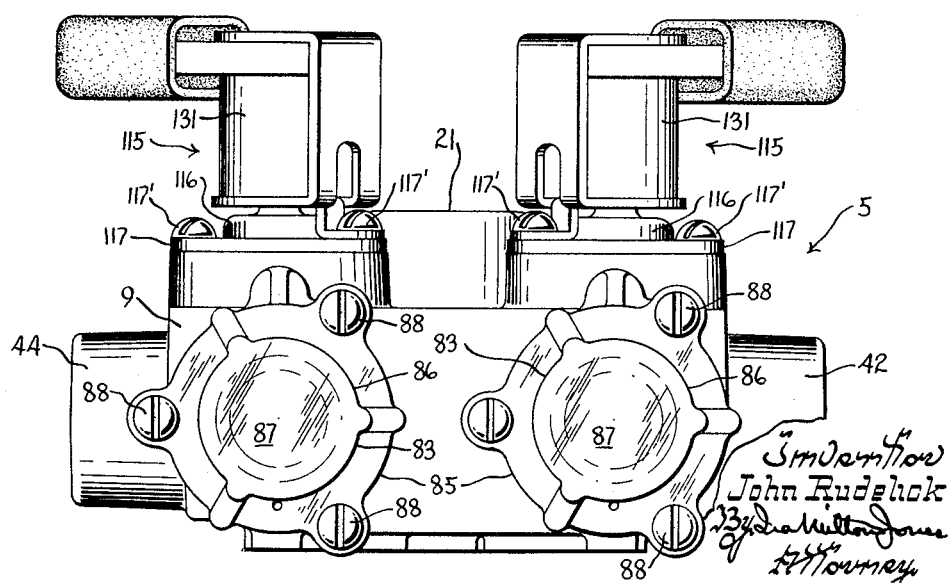

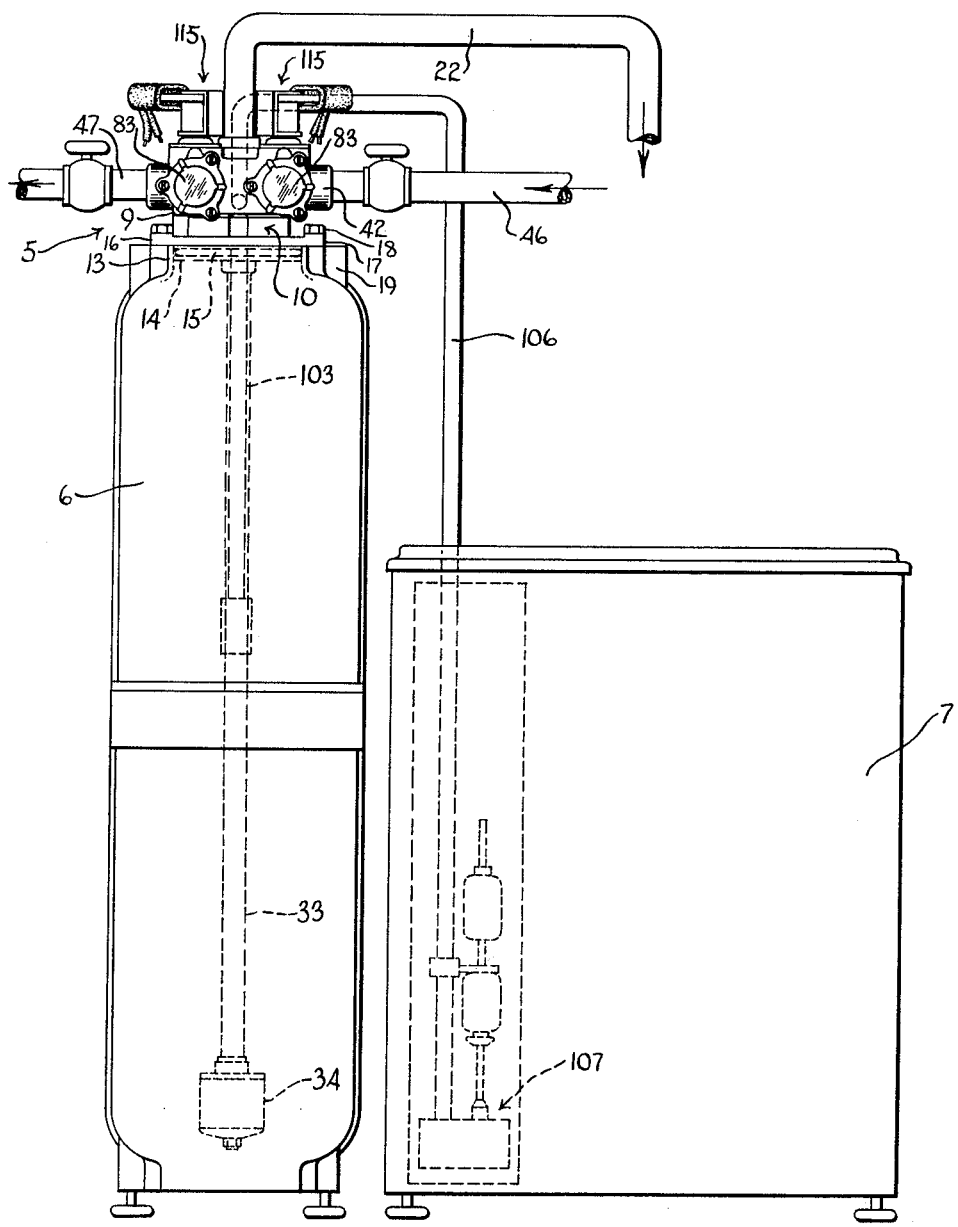

May 4, 1965 J. RUDELICK 3,181,564
CONTROL VALVE FOR WATER SOFTENERS
Filed Nov. 1, 1962 6 Sheets-Sheet 3
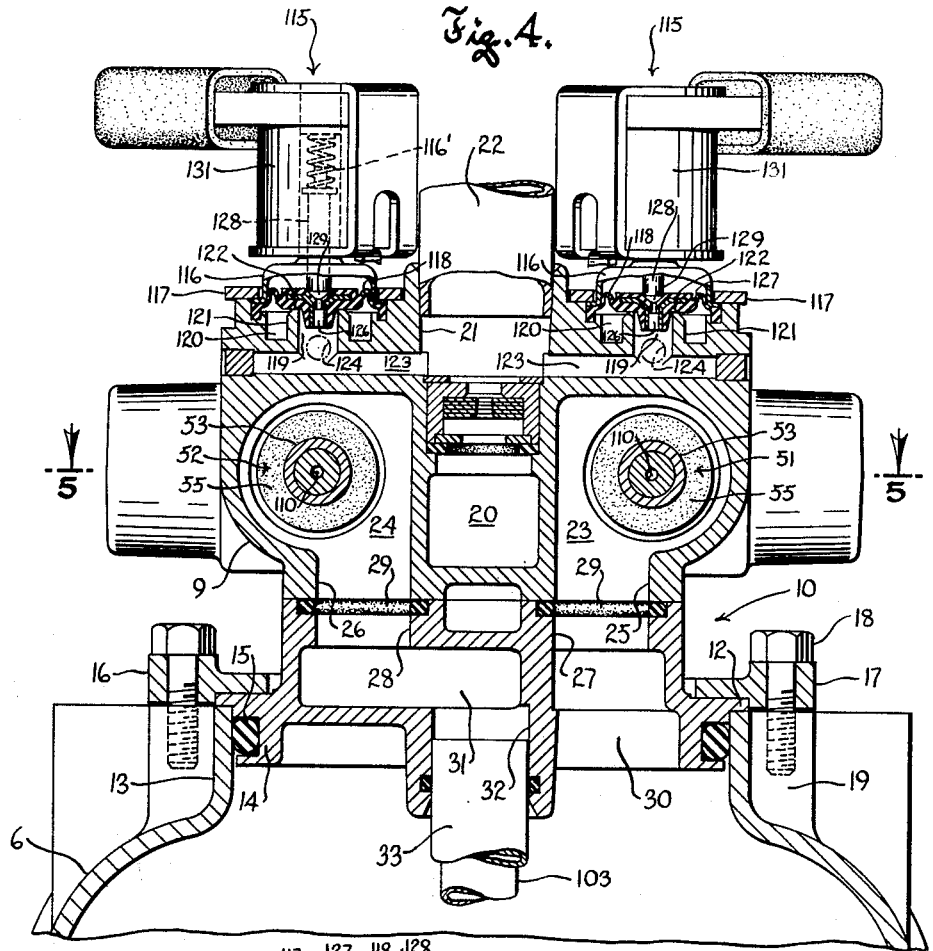
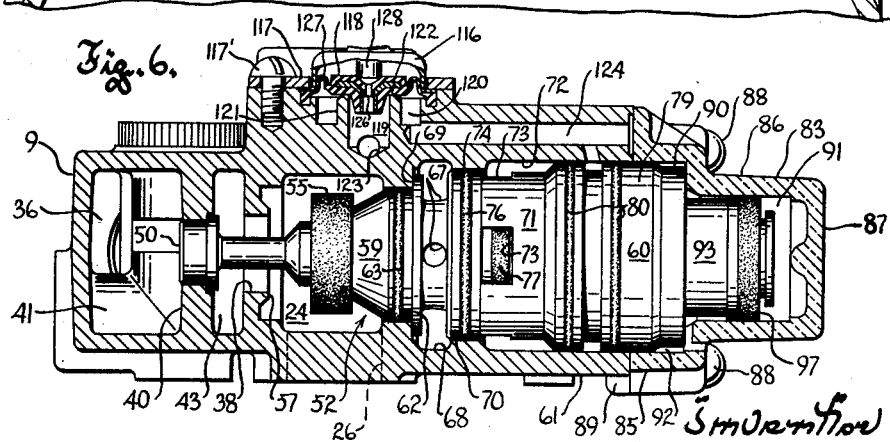

May 4, 1965 J. RUDELICK 3,181,564
CONTROL VALVE FOR WATER SOFTENERS
Filed Nov. 1, 1962 6 Sheets-Sheet 4

John Rudelick

United States Patent Office
3,181,564
Patented May 4, 1965

3,181,564
CONTROL VALVE FOR WATER SOFTENERS
John Rudelick, Milwaukee, Wis., assignor to Bruner Corporation, Milwaukee, Wis., a corporation of Wisconsin
Filed Nov. 1, 1962, Ser. No. 234,669
13 Claims. (Cl. 137—599.1)

This invention relates generally to fluid flow control devices and has more particular reference to a control valve that is ideally suited for the control of fluid flow in water treating and conditioning apparatus, especially water softening systems.

In general, it is a purpose of this invention to provide an improved control valve for water treating apparatus such as water softeners.

More particularly, it is the purpose of this invention to provide a control valve for a water softening system having valve mechanism which is actuatable from a normal or service position to a number of other positions at which it effects a regenerating cycle comprising the steps of brining of the ion exchange material contained in the softener tank, backwashing of said material, and finally rinsing of the bed of ion exchange material.

Another object of the invention resides in the provision of a control valve of the character described which embodies a unique arrangement of passages and ports and a pair of two-position valve members which govern communication between said passages and ports and effect the above enumerated functions of the valve mechanism as a consequence of shifting of said valve members to different relative positions.

A further purpose of this invention resides in the provision of a control valve of the character described which is especially well suited for automatic operation, and wherein back and forth actuation of the valve members from one position to the other thereof is effected hydraulically.

Still another object of the invention resides in the provision of a control valve mechanism of the character described having two main ports and a waste outlet, and wherein communication between one of said main ports and the waste outlet is controlled by one of the valve members while communication between the other main port and the waste outlet is under the control of both valve members.

It is also an object of the invention to provide a control valve of the character described wherein shifting of either of the two-position valve members out of a normal service position effects bypass of untreated water from an inlet passage in the body of the valve to a service passage from which treated water normally issues from the body of the valve.

Another object of the invention resides in the provision of a control valve of the character described, wherein fluid in the inlet passage of the valve body is diverted into an injector passage as a consequence of movement of both valve members out of their normal service positions.

Still another object of the invention is to provide a control valve mechanism of the character described which is constructed to simplify assembly and disassembly of its components, and thus features ready accessibility of its parts for service and/or replacement purposes.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

FIGURE 1 is an elevational view of a water softening system equipped with a control valve of this invention;

FIGURE 2 is an enlarged plan view of the control valve seen in FIGURE 1, with part of one of its components detached to show details of construction;

FIGURE 3 is an enlarged front elevational view of the control valve seen in FIGURE 1;

FIGURE 4 is a cross sectional view taken through FIGURE 2 along the line 4—4, and illustrating the manner in which the control valve may be mounted on the top of a softener tank;

FIGURE 6 is a longitudinal sectional view taken on the plane of the line 6—6 in FIGURE 5;

Figure 5:
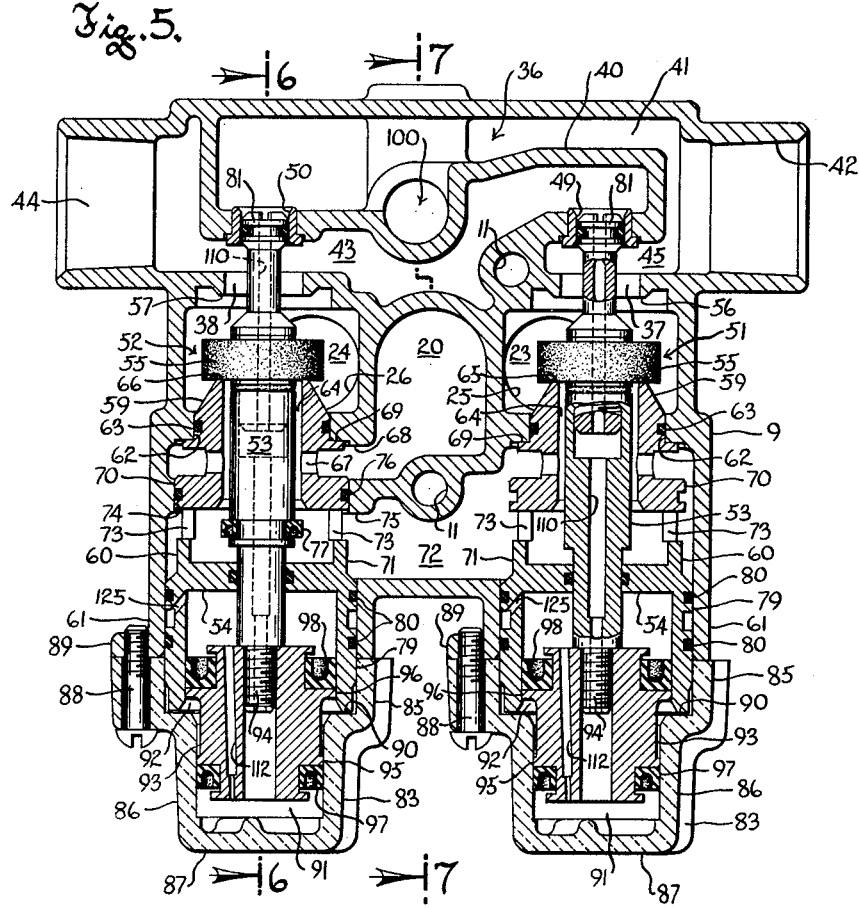
FIGURE 5 is a horizontal sectional view through the control valve, taken on the plane of the line 5—5 in FIGURE 4, and showing the two valve members of the mechanism in normal or service positions.

Referring now more particularly to the accompanying drawings, wherein like reference characters have been applied to like parts throughout the views, the numeral 5 generally designates the control valve of this invention. FIGURE 1 illustrates how the control valve 5 may be mounted on the top of a water softening tank 6 if desired, to control the normal service flow of water downwardly through the bed of ion exchange material (not shown) in the tank and to also effect regeneration of the exchange material. During regeneration, the valve mechanism functions to educt brine from a brine tank 7 forming part of the water softening system, and to direct such brine downwardly through the softener tank. Backwashing of the bed of ion exchange material in the softener tank may follow brining as the second step of a regenerating cycle, although it will be appreciated from the following description that the valve mechanism of this invention is operable to effect backwashing prior to brining, if desired. Fresh hard water is caused to flow through the water softener tank from the top thereof, as the final step of a regenerating cycle.

The control valve 5 comprises a body casting 9 which is of box-like construction and substantially squat or shallow. When it is to be mounted on the top of a water softener tank as seen in FIGURE 1, an adaptor generally designated 10 is secured to its underside by a plurality of screws (not shown) which extend downwardly through suitable apertures 11 in the body and thread into upper portions of the adaptor.

The adaptor 10, which is more or less ring shaped, has a flange 12 to seat upon the extremity of the neck 13 at the open upper end of the softener tank 6, and a cylindrical closure 14, which projects downwardly from the flange and is of a size to enter and close the neck 13. A groove in the periphery of the closure accommodates an O-ring seal 15, which bears upon the inner surface of the neck 13 to provide a leak proof connection between the adaptor ring and the tank.

A clamping ring 16 that fits over the flange 12 on the adaptor holds the latter in place upon the upper end of the softener tank, and for that purpose it has a plurality of apertured ears 17 through which screws 18 may be passed for threaded engagement in lugs 19 on the exterior of the neck 13 of the softener tank.

The valve body 9 is formed with a central chamber 20, more or less centered over the adaptor 10, and which opens upwardly to the top of the body through a drain port 21 in which a drain line 22 may be connected. At opposite sides of the chamber 20, the body 9 is formed with a pair of chambers 23 and 24 which open downwardly to the bottom of the body through main or tank ports 25 and 26, respectively. The port 25 may be referred to as a top tank port since it is adapted to be connected to the upper interior portion of a water softener tank, while the port 26 may be said to comprise a bottom tank port since it is adapted to be connected with the lower interior portion of a water softener tank.

If the control valve of this invention were not mounted upon the top of the softener tank as seen in FIGURE 1, such connections between the main ports and the tank could be readily effected in a conventional manner by means of suitable piping or ducts. In the present case, however, the main ports 25 and 26 register with ports 27 and 28, respectively, at the top of the adaptor 10, and O-ring seals 29 encircling the mouths of the ports and confined between the underside of the valve body and the top of the adaptor assure a leakproof connection at those locations where liquid is transferred from one port to the other, from the valve to the adaptor or vice versa.

The adaptor port 27 comprises the upper end of a passage 30 which opens through the bottom of the adaptor so as to communicate directly with the interior of the softener tank at its upper end. Similarly, the adaptor port 28 comprises the upper end of a passage 31 that opens downwardly through a port 32 to the bottom of the adaptor. An elongated tube 33 received in the port 32, extends downwardly in the softener tank to a location close to its bottom, where it preferably has a distributor or strainer 34 secured thereto.

An elongated chamber 36 is formed on the rear of the valve body and extends transversely thereacross, behind the chambers 23 and 24. The chambers 23 and 24 are communicated with the chamber 36 through substantially large diameter ports 37 and 38, respectively, in their rear walls.

The transverse chamber 36 has a partition member 40 therein which divides its interior into inlet and outlet compartments, namely an elongated inlet compartment 41 that extends along the rear wall of the chamber and opens to the right side of the body through an inlet port 42, and an elongated outlet compartment 43 that extends along the front wall of the chamber, in side-by-side relation to the inlet passage 41, and which opens to the left side of the body through a service port 44. The partition member 40, however, has an irregular shape such as to define a short inlet branch 45 into which the port 37 opens. Consequently, that portion of the outlet compartment 43 which is nearest the inlet port 42 is located more or less centrally between the inlet compartment 41 and its branch 45, and rearwardly of the chamber 23. Similarly, that portion of the inlet compartment 41 which is nearest the service port 44 is rearwardly of the chamber 24, and separated from the rear wall of the latter by a portion of the outlet compartment 43.

The port 42, of course, provides for connection of the control valve of this invention with a hard water supply line 46, while the service port 44 provides for delivery of treated or softened water to a service line 47 connected with the port 44.

The partition member 40 not only divides the interior of the chamber 36 into what might be termed overlapping transversely extending inlet and outlet compartments, but it also serves to normally prevent communication between the inlet port 42 and the service port 44.

At times when the control valve of this invention is effecting regeneration of a water softener, however, provision is made to bypass fresh raw water to the service port, and for this purpose the partition member 40 is provided with a first bypass port or passage 49 therein coaxial with the port 37, to communicate the inlet branch 45 with the outlet compartment 43 at a location behind the chamber 23, and a second bypass port 50 coaxial with the port 38 to communicate the inlet compartment 41 with the outlet compartment 43 at a location behind the chamber 24. Communication between the inlet port 42 and the service port 44 through the bypass ports 49 and 50 is normally blocked by valve mechanism now about to be described.

The valve mechanism incorporated in the control valve of this invention comprises a pair of nearly identical valve units 51 and 52 respectively associated with the main ports 25 and 26. Each valve unit comprises an elongated stem 53, and the stems are slidably guided in transverse bearing walls 54 in the body for endwise fore and aft movement with their axes parallel and lying in a common horizontal plane. The stem of the valve unit 51 extends rearwardly from its bearing into the chamber 23 and coaxially through the port 37 into the bypass port 49. Similarly, the stem of the valve unit 52 extends rearwardly from its bearing into the chamber 24 and coaxially through the port 38 into the bypass port 50.

One of the functions of the valve unit 51 is to control communication between its main port 25 and the inlet port 42 through the internal port 37 which communicates the chamber 23 with the inlet branch 45. Similarly, one of the functions of the valve unit 52 is to control communication between its main port 26 and the service port 44 through the internal port 38 which communicates the chamber 24 with the outlet compartment 43.

Figure 8:
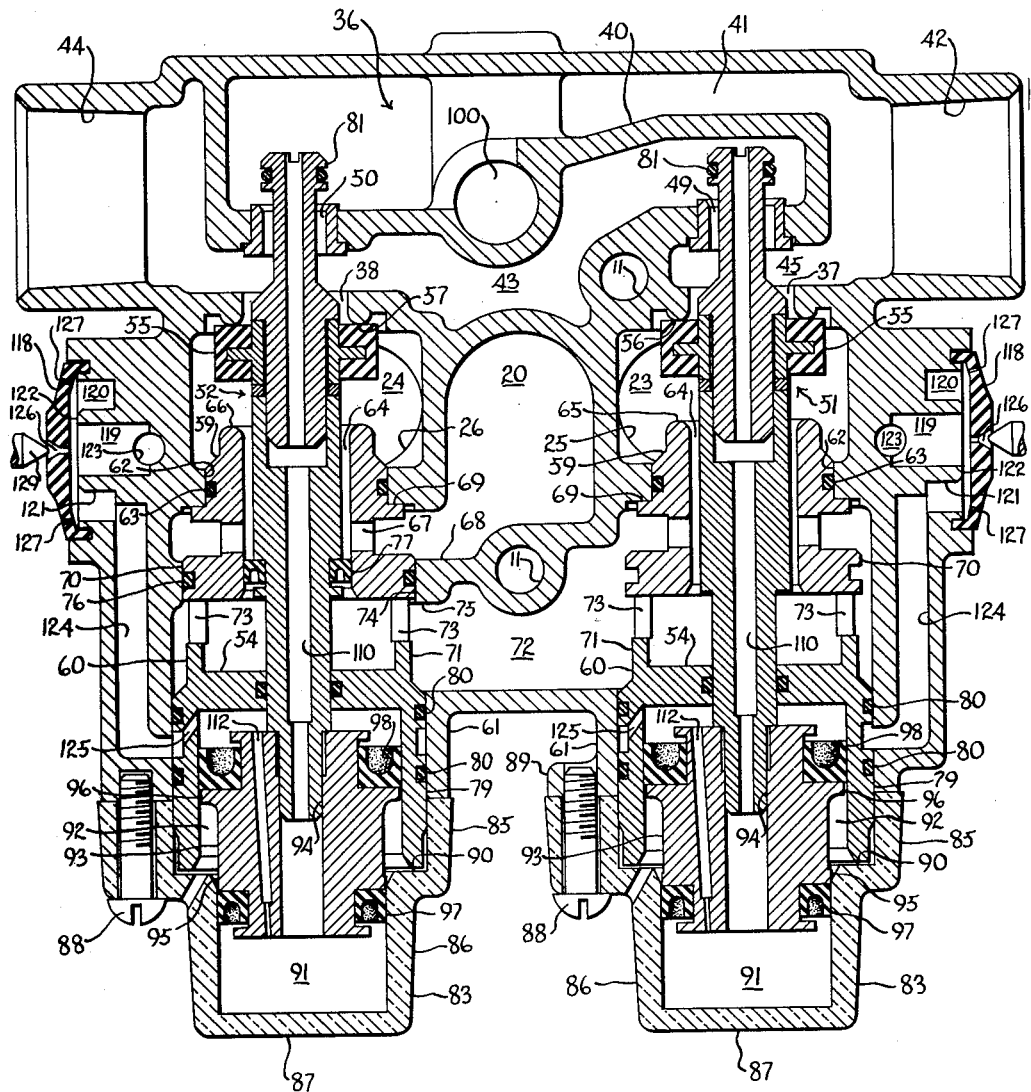
FIGURE 8 is an enlarged sectional view similar to FIGURE 5 somewhat diagrammatically illustrating certain features of the valve, and showing the valve elements thereof in regenerating positions at which brining is effected.

For this purpose, each of the valve stems has a resilient valve disc 55 coaxially but detachably secured thereto and movable back and forth in its associated chamber 23–24. The internal ports 37 and 38 open into their respective chambers 23 and 24 through annular forwardly facing valve seats 56 and 57, respectively, which seats may be engaged by the discs 55 to close the internal ports 37–38 and define the rearward limits of motion of the valve units, as seen in FIGURE 8.

Each of the valve stems 53 extends forwardly from the valve disc 55 thereon, coaxially through a pair of tandem arranged annular inserts 59 and 60, which are axially slidably received in the hollow interior of the valve body for removal through tubular forward extensions 61 on the body. The rearmost annular inserts 59 have cylindrical rear portions that fit in and close holes 62 in the front walls of the valve chambers 23 and 24, and O-ring seals 63 on the inserts bear against the walls of their holes 62 to prevent the escape of fluid in the chambers 23 and 24 around the exteriors of these inserts.

The bores of the rear inserts 59 cooperate with the stems 53 of the valve units to define annular waste or drain passages 64 that communicate with the valve chambers 23 and 24, and which may be closed to block their communication with the main ports 25 and 26 by the valve discs 55 in the forward limits of motion of the valve units. For this purpose, the rear of the insert surrounding the stem of valve unit 51 projects into chamber 23 and is formed to provide an annular rearwardly facing seat 65 that is coaxial with and opposes the seat 56, and which is engaged by the valve disc 55 on the valve unit 51 to define its forward limit of travel. The rear insert associated with the valve unit 52 is similarly formed to provide an annular rearwardly facing valve seat 66, opposing the valve seat 57, and which defines the forward limit of travel of the valve unit 52 when it is engaged by the valve disc 55 thereon.

For convenience, the annular seats 65 and 66 may be referred to as drain ports.

The annular drain passage 64 through the rear insert for valve unit 52 communicates more or less directly with the exhaust chamber 20 through radial apertures 67 in the side wall of the insert, which apertures open to a lateral branch 68 of the exhaust chamber. Hence, communication between the main port 26 and the exhaust or drain chamber 20 is controlled solely by the position of the valve disc 55 on the valve unit 52. As will be described shortly, however, the main port 25 can only be communicated with the exhaust chamber 20 when the valve disc 55 of the valve unit 51 is moved rearwardly off of its seat 65, and the valve disc of the valve unit 52 is in its forward position closing the drain port 66.

The rear inserts 59 are alike in that each has a rear flange 69 that engages the front wall of the chamber behind it to define the proper position of the insert. The apertures 67 in the side walls of each of the inserts 59 are situated between the locating flanges 69 and larger diameter flanges 70 on the fronts of the inserts. The flanges 70 are engaged by the rear ends of cylindrical skirts 71 on the front inserts, extending rearwardly from the bearing walls 54 which form a part of the front inserts, so that these skirts hold the rear inserts in place in the valve body.

The skirts 71 project into a chamber 72 in the valve body, extending transversely across the front portion thereof, and the interiors of the skirts 71 are communicated with the chamber 72 through a plurality of notches 73 in the rear ends of the skirts. Hence, the drain passage 64 for the valve unit 51 communicates with the chamber 72 through both the apertures 67 in its rear insert and through the notches 73 in the skirt 71 of its front insert.

The front of the drain passage 64 for valve unit 52 opens to the interior of the skirt 71 on its front insert, and thus also communicates with the front chamber 72, through the notches 71 in the skirt encircling the stem of the valve unit 52. Consequently, the main port 25 may be communicated with the drain or exhaust passage 20, through the drain passage 64 of valve unit 51, the front chamber 72, and the forward end portion of the drain passage 64 of valve unit 52.

Attention is directed to the fact that while the front flange 70 of the rear insert for valve unit 51 merely extends into the front chamber 72, the correspoding flange on the rear insert for the valve unit 52 is confined in a hole 74 in a body wall 75 that separates the front chamber 72 from the exhaust chamber 20. An O-ring seal 76 surrounding the last lamed flange and engaging the surface of the hole prevents fluid from leaking around the exterior of the flange. The valve unit 52 has a second valve element 77 mounted on and surrounding its stem 53, and so located thereon as to enter and close the front end of the annular drain passage 64 in its insert 59 whenever the valve unit is moved to its rearward limit of travel, seen in FIGURE 8. Note, however, that when the valve element 77 is in its passage closing position, it does not interfere with the flow of fluid from the valve chamber 24 to the drain or exhaust chamber 20.

With the arrangement described, the valve unit 52 cooperates with the valve unit 51 to control communication between the main port 25 and the drain chamber 20; and there will never be a time when both main ports 25 and 26 are communicated with the drain chamber 20. Also with this arrangement, it will be apparent that the branch 68 of the drain chamber constitutes a drain passage that is common to both main ports 25 and 26.

The forward annular inserts 60 also have forwardly projecting cylindrical skirts 79, larger in diameter than the front flanges 70 on the rear inserts, and slidingly fitting the tubular forward extensions 61 on the body. The skirts 79 project from the transverse bearing walls 54 on the inserts, and are formed integrally therewith, and they extend a distance beyond the front ends of the tubular extensions 61. A pair of O-rings 80, encircling each of the skirts 79 engages the inner surface of the surrounding tubular extension 61 to provide a leakproof seal therebetween.

At their rear ends, the stems 53 of the valve units 51 and 52 have enlargements that carry O-ring valve elements 81 to respectively engage in the bypass ports 49 and 50 and close the same in the normal forward positions of the valve units seen in FIGURE 5.

When the valve units are moved to their rear positions seen in FIGURE 8, for regenerating purposes, the valve elements 81 are moved rearwardly through the bypass ports 49 and 50 to open the same.

Cup-like closure members or caps 83 are secured to the front of the valve body, over each tubular extension 61 thereof, to close off the open forward ends of the tubular extensions, and to hold the front inserts 60 against forward displacement. These caps are preferably formed of a transparent plastic material, and they have large diameter rim portions 85 which encircle the forward end portions of the front skirts 79 on the forward inserts and abut the front ends of the tubular extension 61 on the body. In addition, each of the caps has a smaller diameter cylindrical body portion 86 ahead of its rim portion, which extends forwardly to the end wall 87 of the closure. A plurality of screws 88 passing through suitable apertures in ears on the rim portions of the caps and threading into mating ears 89 on the front ends of the extensions 61 secure the caps in place on the front of the body.

Forward displacement of the front inserts 60 relative to the valve body is precluded by means of shoulders 90 which are formed on the caps 83 at the junctions of their large diameter rim portions with their smaller diameter body portions. These shoulders face rearwardly and are contiguous to the forward extremities of the skirts 79.

The caps 83 cooperate with the forwardly extending skirts 79 on the front inserts 60 to define cylinders, each having a small diameter forward end 91 opening to a larger diameter rear end 92. The small diameter ends of the cylinders are defined by the bodies 86 of the caps, while the larger diameter rear ends of the cylinders are defined by the cylindrical skirts 79 on the front inserts. An annular piston 93 is slidable fore and aft in each of these cylinders and the pistons are coaxially threaded onto the forward extremities of the stems 53 of the valve units as at 94. Each piston, of course, has a small diameter front portion 95 to fit the small diameter forward end of its cylinder, and a larger diameter rear portion 96 which slidably fits the larger diameter end 92 of its cylinder.

Resiliently flexible front and rear annular seals 97 and 98 encircling the small and large diameter ends of the pistons, respectively, engage the cylinder walls to provide sliding seals that prevent flow of fluid around the exteriors of the pistons.

As will be explained at greater length hereinafter, the cylinders and the pistons therein provide hydraulic actuators by which the valve units can be driven either forwardly or rearwardly to each of their operating positions to thus effect control of the flow of fluid through the various passages and ports inside the valve body. Though fully disclosed herein, the hydraulic actuators are claimed in my copending divisional application Serial No. 356,517 filed April 1, 1964.

For example, when liquid at source water pressure is present in the cylinder space between the larger ends of the pistons and the bearing walls 54 on the front inserts, forces are exerted upon the large diameter ends of the pistons such as to move the same forwardly and thus actuate the valve units to their forward or service positions seen in FIGURE 5, at which their valve discs 55 engage and close the rearwardly facing drain ports 65 and 66 to thus block communication between both main ports 25 and 26 and the drain chamber 20, and their bypass valve elements 81 close the bypass ports 49 and 50. The valve units are normally held in these service positions by the action upon the pistons of source water under pressure in the large diameter ends of the cylinders.

In their service positions, the valve units 51 and 52 cooperate to communicate the main port 25 with the inlet port 42 for the flow of fresh hard water downwardly into the softener tank, and to communicate the other main port 26 with the service port 44 so that treated water may flow upwardly into the chamber 24 and out through the now open port 38 to the outlet compartment 43. Thus a flow circuit is provided by which a softener system having the control valve of this invention incorporated therein can be said to be in downflow service operation.

Assuming now that the spaces inside the larger diameter ends of the cylinders are vented, and that liquid at source water pressure is present in the small diameter ends of the cylinders, forces are exerted upon the small diameter ends of the pistons to propel the same rearwardly and thus actuate the valve units to their rear limits of motion defined by the engagement of their valve discs 55 with the forwardly facing valve seats 56 and 57. This is the condition illustrated in FIGURE 8, where both valve units are in their rearward positions and both bypass ports 49 and 50 are open. One of the valve discs 55 then blocks communication between the main port 25 and the inlet port 42, and the other disc 55 blocks communication between the main port 26 and the service port 44. This may be said to be a first regenerating position of the control valve of this invention, and it should be noted that in the relative positions of the valve units seen in FIGURE 8, the foremost valve element 77 on the stem of the valve unit 52 has been carried into the front end of the annular drain passage 64 for valve unit 52, to block communication between the main port 25 and the drain chamber 20. However, communication has now been established between the main port 26 and the drain chamber 20, through the rear portion of the drain passage 64 of the valve unit 52.

Figure 7:
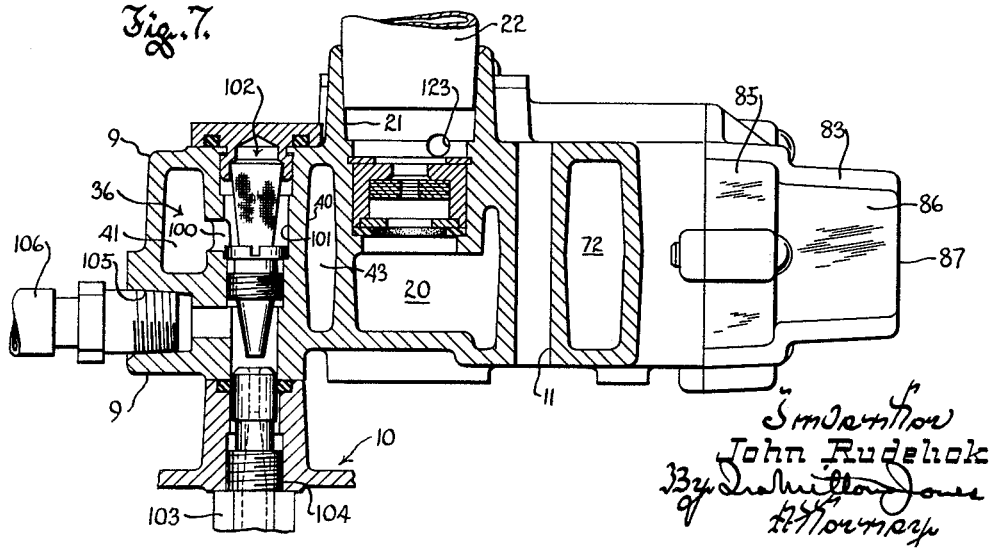
FIGURE 7 is another sectional view taken on the plane of the line 7—7 in FIGURE 5.

Since both bypass ports 49 and 50 are then open, fresh hard water entering the inlet port 42 may flow through either or both bypass ports to the service port 44, but not to either of the main ports 25 and 26. Also in the relative positions of the valve units seen in FIGURE 8, source water in the inlet compartment 41 is constrained to flow into the inlet 100 of a downwardly extending passage 101 in which an injector assembly 102 is mounted (see FIGURE 7). The outlet of the injector has here been shown as located within the adaptor ring 10, although the entire injector assembly could as well be contained within the control valve body 9.

In either event, the outlet 104 of the injector communicates with a delivery tube 103 that is secured to the adaptor ring and extends downwardly therefrom into the interior of the softener tank to a level near the top of the mineral bed therein. The valve body is also provided with an eduction port 105 opening to the passage 101 at a point alongside the injector nozzle, and which port is adapted to be communicated by a brine line 106 with a more or less conventional brine valve 107 in the brine tank 7. Consequently, whenever source water is forced downwardly through the injector, brine is educted from the brine tank to enter the passage 101 through the eduction port 105. Such brine is carried along with water flowing through the injector into the softener tank for downward flow therethrough, to effect regeneration of the ion exchange material in the tank.

After flowing downwardly through the bed of ion exchange material, the spent brine is conducted upwardly through the duct 33 and the main port 26 to the chamber 24, from whence it flows forwardly through the annular drain passage 64 to the drain chamber 20 for discharge through the duct 22.

Figure 9:
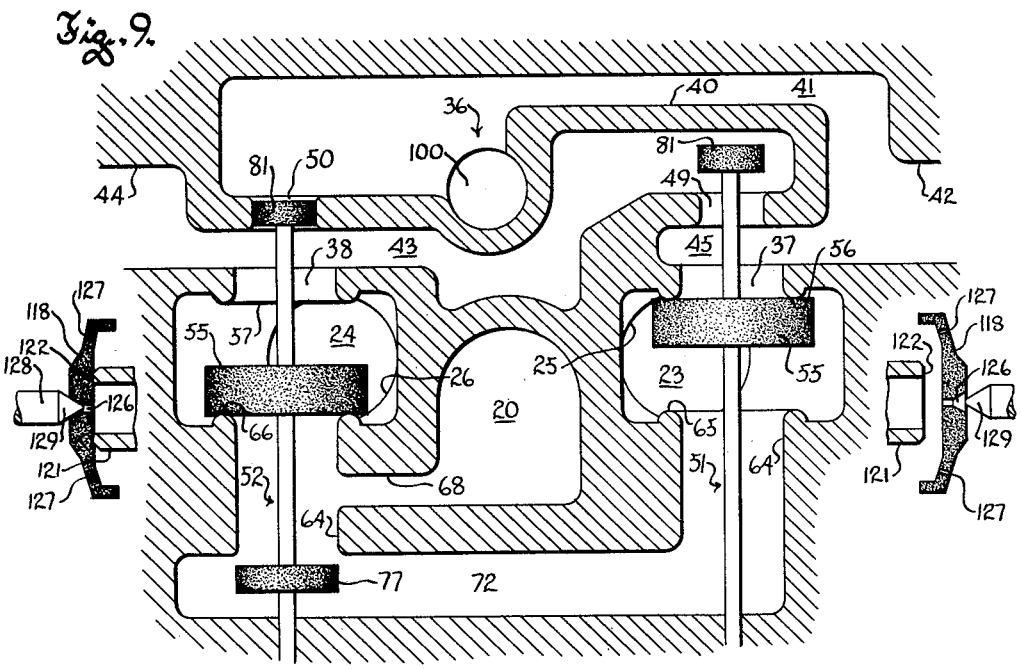
FIGURE 9 is a diagrammatic sectional view illustrating the relative positions of the valve members at which backwashing is effected.
Figure 10:
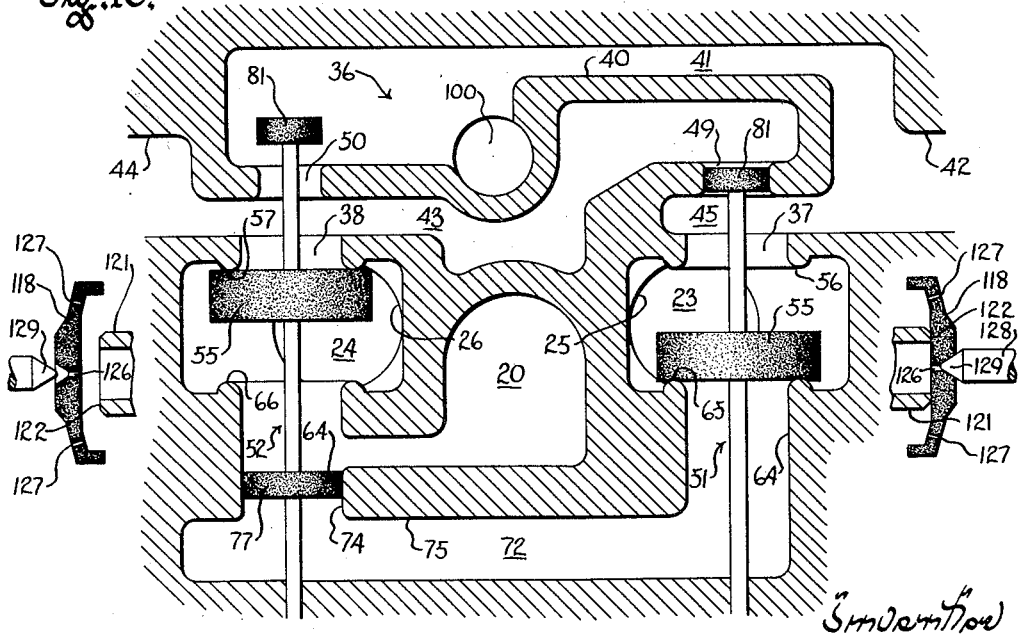
FIGURE 10 is a diagrammatic sectional view similar to FIGURE 9 but illustrating the relative positions of the valve members at which flushing is effected as the final step of a regenerating cycle.

FIGURES 9 and 10 diagrammatically illustrate the relative positions of the valve units at which backwashing and flushing, respectively, are effected as the second and final steps of a regenerating cycle.

Referring first to FIGURE 9, it will be noted that backwashing is accomplished when the valve element 51 is at its rearward limit of travel while the valve element 52 is at its forward limit of travel. The bypass port 49 is then open, and the valve disc 55 of valve unit 51 engages the forwardly facing seat 56 to block communication between the main port 25 and the inlet port 42, leaving the main port 25 in communication with the drain port 65. The bypass port 50 is closed by the valve element 81 on valve element 52, while the valve disc 55 thereof closes off the drain port 66 and establishes communication between the main port 26 and the outlet compartment 43, which is now in communication with the inlet branch 45 through the bypass port 49 governed by valve unit 51. Accordingly, fresh hard water entering the inlet port may flow through the bypass port 49 into the outlet compartment 43, and through the port 38 into the chamber 24 from whence it may flow downwardly to issue from the main port 26 into the duct 33 for passage to the bottom of the water softener tank. Backwash water debouches from the strainer end of the duct 33 and flows upwardly through the bed of ion exchange material to effect backwashing thereof, and the backwash effluent discharges from the top of the tank into the chamber 23, through main port 25, from whence it may flow to drain via the drain port 65 and drain passage 64, the transverse chamber 72, and the now open front portion of the annular passage 64 surrounding the stem of the valve unit 52.

FIGURE 10 shows the relative positions of the valve units 51 and 52 necessary to effect flushing of the softener tank after the backwashing step is terminated. To effect this final stage of a regenerating cycle, the valve unit 51 must be in its forward position at which its valve disc 55 engages and closes the drain port 65 and its valve element 81 closes the bypass port 49; while the valve unit 52 must be in its rear position at which the valve element 77 thereon closes the front end of its drain passage 64 and its valve disc 55 engages and closes the forwardly facing seat 57, while the rear valve element 81 leaves the bypass port 50 open. Hence, source water entering the inlet port 42 may flow through the then open port 56 into the chamber 23 and out of the main port 25 to the top of the softener tank. It then flows downwardly through the bed of ion exchange material to rinse the same, and the effluent enters the duct 33 through strainer 34, flows upwardly into the chamber 24 through main port 26, and then through the drain passage of valve unit 52 to the exhaust chamber 20 via the radial outlets 67.

Following a suitable interval during which flushing takes place, both valve units are returned to their forward positions seen in FIGURE 5 to again place the system in service operation.

In order to provide for back and forth actuation of the pistons in their respective cylinders and consequent shifting of the valve units between their service and regenerating positions described, provision is made for introducing fluid under pressure into the small diameter ends of the cylinders. While this may be accomplished by means externally of the valve body, this invention features duct means that are built into the valve body to not only enable source water from the inlet to be supplied to the small diameter ends of the cylinders, but to also enable the large diameter ends of the cylinders to be vented to the exhaust chamber 20.

Source water under pressure is fed into the small diameter forward ends of both cylinders by means of axial passages 110 extending entirely through the valve stems 53 of the two-valve units and axially through the bores of the annular pistons 93 on their forward ends. Hence, when the valve units are in their service positions seen in FIGURE 5, source water under pressure in the inlet compartment 41 may flow forwardly through the axial passage 110 in the valve unit 52 and the bore of the piston thereon to the small diameter end 91 of the cylinder for valve unit 52. Since water in the softener tank is under the same pressure as fluid in the inlet compartment 41, such pressure is manifested in the outlet compartment 43, so that water therein will flow rearwardly through the axial passage 110 in the stem of the valve unit 51 and the bore of its piston into the small diameter forward end 91 of the cylinder for valve unit 51.

Fluid in the small diameter ends 91 of the cylinders is led rearwardly through restricted passages 112 in the pistons to the large diameter ends 92 of the cylinders, to fill the space therein. Consequently, the fluid in the large diameter ends 92 of the cylinders exerts a greater force upon the pistons than does fluid in the small diameter ends 91 of the cylinders, with the result that both pistons are held in their forward or service positions until such time as the larger diameter ends 92 of the cylinders are vented and fluid therein is allowed to escape to the drain chamber 20.

When that occurs, the valve units are propelled rearwardly out of their normal positions by the forces which fluid under pressure in the small diameter ends 91 of the cylinders exert upon the pistons. According to this invention, the venting of the large diameter rear end of each cylinder is controlled by an electromagnetically governed diaphragm type valve mechanism 115 of a known type. The valve mechanisms 115 are mounted upon the top of the valve body at transversely opposite sides of the drain port 21, nearly directly over the valve chambers 23 and 24. As seen best in FIGURE 4, each of the units 115 comprises a housing the bottom portion of which provides an inverted cup-like diaphragm chamber 116. The open end of the diaphragm chamber has an outwardly directed flange that is engaged over the peripheral portion of a flexible diaphragm 118 to hold the same centered over concentric inner and outer chambers 119 and 120, respectively, both of which open upwardly toward the under side of the diaphragm. A clamping ring 117 secured to the body by screws 117' (see FIGURE 2) overlies the flange on the diaphragm chamber to hold same in place on the valve body.

The chambers 119 and 120 are separated by an upstanding tubular neck 121 on the valve body, the upper extremity of which defines an annular valve seat 122. The lower end portion of the inner chamber 119 opens to the transversely extending branch 123 of a cylinder exhaust passage in the valve body, and which branch communicates at its inner end with the exhaust port 21. The outer chamber 120 communicates with the forwardly extending branch 124 of the exhaust passage for the adjacent cylinder.

The forward ends of the exhaust passage branches 124 communicate with the interiors of the large diameter ends of the cylinders through radial openings 125 in the front cylindrical skirts 79 of the inserts 60. While the actual arrangement of vent passage branches 123 and 124 and the diaphragm chambers 119 and 120 is shown in FIGURES 4 and 6, attention is directed to FIGURE 8 where these passages, the diaphragms 118, and the chambers 119 and 120 associated therewith are shown diagrammatically in a simplified form so that their functions and operation can be more easily understood.

Thus, as diagrammatically illustrated in FIGURE 8, each of the diaphragms 118 has a small diameter central hole 126 therethrough that registers with the chamber 119 beneath it, and a plurality of even small diameter vents 127 that register with the outer annular chamber 120 and similarly communicate with the space inside the diaphragm housing.

As will be apparent to those familiar with the construction of the electromagnetic valve units 115, the diaphragm chamber of each is closed at its bottom by the diaphragm 118, and has a smaller diameter tubular portion 116' extending upwardly therefrom and closed at its top. An electromagnetically responsive plunger 128 slides up and down in the tubular top portion 116' of the diaphragm chamber and is normally biased downwardly by a light spring, to yieldingly hold a pointed lower extremity 129 on the plunger in the central aperture 126 in the diaphragm to close said aperture. This also causes a downward bias to be exerted on the diaphragm sufficient to hold its underside engaged with the annular seat 122 surrounding the central chamber 119, to block communication between the latter and the annular chamber 120.

This is the normal condition of each valve unit 115, at which the vent passage for its cylinder is closed and fluid under pressure is trapped in the large diameter end of its cylinder, causing the piston therein to be held in its forward position shown in FIGURE 5.

Upon energization of the coil 131 surrounding the upper tubular portion 116' of each of the electromagnetic units 115, the stem or pilot 128 thereof is attracted upwardly to uncover the central aperture 126 in the diaphragm and allow fluid under pressure in the diaphragm chamber to exhaust therefrom at a rate faster than it can flow into the chamber through the small apertures 127. As a result, the pressure of fluid in the large diameter end of the cylinder and its vent passage 124 moves the diaphragm 118 upwardly off of its seat 122 to communicate the vent passage 124 with the drain port 21.

Normally, when the diaphragm is engaged with the seat 122, fluid under pressure in the outer or annular chamber 120 surrounding the seat 122 can flow upwardly into the diaphragm chamber through the small diameter ports 127 therein to maintain a pressure upon the top of the diaphragm that aids the plunger 128 in holding the diaphragm on its seat.

As shown best in FIGURE 8, the diaphragms 118 for both valve units 51 and 52 have been lifted upwardly off of their respective seats 122 to vent the large diameter ends of their cylinders. When this occurs, the pressure in the large diameter ends of the cylinders is suddenly reduced to a value below that which will obtain in the small diameter ends of the cylinders, due to the restricted nature of the piston passages 112, and sufficient force is thus exerted upon the small diameter ends of the pistons to propel the same rearwardly and thereby cause actuation of the valve elements 51 and 52 to their rear or brining positions described earlier.

The valve units 51 and 52 will remain in these regenerating positions until the coils 131 of their associated electromagnetic operators 115 are deenergized. Hence, for example, the brining step of a regenerating cycle may be terminated and backwashing commenced by effecting deenergization of the coil 131 of the electromagnetic unit associated with the valve unit 52, to cause the diaphragm 118 thereof to resume its closed position engaging its associated seat 122, while keeping the coil 131 of the other electromagnetic operator for valve unit 51 energized.

Consequently, the valve unit 51 will remain in its rearmost position, while the closing of the vent passage for the large diameter rear end of the cylinder for valve unit 52 causes a buildup in fluid pressure in the cylinder such as to actuate the valve unit 52 to its normal position.

To terminate backwashing and to initiate flushing, the coil 131 of the electromagnetic valve unit 115 associated with the valve 51 is deenergized, and the coil of the other valve unit energized, to hydraulically effect reversal of the relative positions of the two valve units 51 and 52 from that seen in FIGURE 9.

When flushing of the softener tank is to be terminated and the softener returned to service operation, the coil 131 of the electromagnetic operator 115 associated with the valve 52 is deenergized, to cause the diaphragm of said operator to again close off its associated vent passage 124 and thus allow valve 52 to be actuated to its normal forward position. Since both valve units 51 and 52 are then in their forward positions seen in FIGURE 5, normal service operation of the softener system is resumed.

It will be understood, of course, that the coils 131 of the electromagnetic units 115 can be energized or deenergized uner the control of a calendar clock of a known type (not shown) which is set to periodically effect a regenerating cycle that may comprise the successive steps of brining, backwashing and flushing, followed by return of the two-valve units to their normal service positions.

One of the features of the control valve described is that the transparent cup-like caps which define the small diameter ends of the cylinders in which the pistons operate, enable visual inspection and determination of the positions of the pistons so that any malfunctioning of the control valve can be detected at a glance. In other words, if the automatic controls have started a regenerating cycle commencing with brining, which requires both valve units to be in their rearmost positions, and it is seen through the transparent wall of one of the caps that the piston thereof is in a forward position, it will be immediately apparent that the unit is malfunctioning. The conventional external bypass valving ordinarily provided in a water softening installation can then be closed off to enable removal of the cap or caps covering the front portions of the pistons which have not operated properly, and the entire valve unit including the inserts through which the valve stem projects, can be slid forwardly out of the valve body for service or replacement if necessary.

In the event of any wear upon the rearwardly facing drain port seats 65 or 66, these seats can be renewed by replacement of the rear insert upon which they are formed. In this respect it will be appreciated that there will be little or no wear upon the forwardly facing valve seats 56 and 57 which are formed directly on the body of the valve or body casting. Slight leakage of the valves at this point, however, can be ignored as it would only occur during a regenerating cycle. The O-ring valve elements 81 governing the bypass ports 49 and 50 are likewise renewable, as are the valve discs 55 once the valve units have been removed from the valve body.

The valve element 77 on valve unit 52, which is adapted to close the front end portion of the annular drain passage 64 in the rear position of the valve unit 52 can also be readily detached from the valve stem 53 of that unit and replaced by a new one, although this would entail unscrewing the valve stem from its piston.

Consequently, it will be seen that the control valve of this invention features ease of service and replacement of worn valve components, and hydraulic actuating means for shifting the valve units to both of their operating positions.

From the foregoing description taken together with the accompanying drawings, it will be readily apparent to those skilled in the art that this invention provides an improved control valve for water treating and softening systems featuring simplicity of construction and easy accessibility of the valve members for removal thereof for service or replacement when needed.

What is claimed as my invention is:

1. A fluid flow control device for liquid treating apparatus, which device is characterized by an inlet for liquid to be treated, an outlet for treated liquid, a pair of main ports for connecting the device with treating apparatus, and a drain port, and is further characterized by the following:
    (A) first and second two-position valves, one for each main port;
    (B) first and second valve controlled ports associated with each valve and arranged to be selectively closed thereby;
    (C) passage means connecting the drain port with each main port through its associated first port;
    (D) passage means connecting the main port of the first valve with the inlet through said second port of the first valve;
    (E) passage means connecting the main port of the second valve with the outlet through said second port of the second valve;
    (F) a valve element on the second valve operable to close the passage means connecting the main port of the first valve with the drain port whenever the second valve is in a position closing said second port thereof;
    (G) and means for moving said valves from one position to the other thereof.

2. The fluid flow control device of claim 1, further characterized by:
    (A) passage means for connecting said second port of the second valve with the inlet;
    (B) and a valve element on said first valve operable to close said last named passage means only when said first valve is in its position closing said first port thereof.

3. Fluid flow control means characterized by the following:
    (A) a first two-position valve having
        (1) a tank port,
        (2) a drain passage communicable with the tank port,
        (3) a fluid supply passage communicable with the tank port, and
        (4) valve means thereon operable in one position of said first valve to close off communication between the tank port and the drain passage, and operable in the other position of said first valve to close off communication between the tank port and the fluid supply passage;
    (B) means for moving said first valve from said one position to the other thereof;
    (C) a second two-position valve having
        (1) a tank port,
        (2) a drain passage communicable with said last named tank port;
        (3) a delivery passage communicable with said last named tank port, and
        (4) valve means thereon operable in one position of said second valve to close off communication between said last named tank port and its associated drain passage, and operable in the other position of said second valve to close off communication between said last named tank port and the delivery passage;
    (D) means for moving said second valve from one position to the other thereof;
    (E) and other valve means movable to and from a position blocking the drain passage of said first valve.

4. The fluid flow control means of claim 3, further characterized by means on said second valve for moving said other valve means to its passage blocking position concomitantly with movement of said second valve to said other position thereof.

5. The fluid flow control means of claim 3, further characterized by:
    (A) means defining a bypass passage to communicate the supply and delivery passages;
    (B) a bypass valve element for the bypass passage, movable to and from a closed position blocking communication between the supply and delivery passages;
    (C) and means operatively connecting the bypass valve element with one of said two-position valves for movement therewith out of its closed position in consequence of movement of said last named two-position valve to said other position thereof.

6. The fluid flow control means of claim 5, further characterized by an injector passage having an inlet that opens to said fluid supply passage, and into which supply fluid can be diverted by the first and second valves when both are in said other positions thereof.

7. The fluid flow control means of claim 3, further characterized by:
    (A) a bypass valve element on each of said two-position valves;
    (B) and means defining first and second bypass passages which are controlled by the bypass valve elements on said first and second two-position valves, respectively, and each of which bypass passages is adapted to communicate the supply passage with the delivery passage upon movement of its associated valve to said other position thereof.

8. The fluid flow control means of claim 7, further characterized by an injector passage having an inlet that opens to said supply passage, and into which supply fluid can be diverted by the first and second valves when both are in said other positions thereof.

9. In a control valve for fluid treating apparatus, wherein the control valve comprises a body having an inlet passage for fluid to be treated, an outlet passage for treated fluid, a first main port that is connectable with the inlet passage through a first valve controlled port in the body and with fluid treating apparatus to normally supply fluid thereto for treatment, and having a second main port that is connectable with fluid treating apparatus and with the outlet passage through a second valve controlled port to normally allow treated fluid to flow to the outlet passage, said control valve being characterized by:
 (A) parallel first and second elongated valve members for the valve controlled port associated with said first and second main ports, respectively, said valve members being mounted in the body for endwise movement between normal positions at which they leave their respective valve controlled ports open, and second positions at which they close their respective valve controlled ports;
 (B) said first and second valve members have end portions which project in the same direction through their respective valve controlled ports;
 (C) the inlet and outlet pasages have portions to which their associated valve controlled ports open and into which said end portions of the valve members extend;
 (D) each of said passages has an extension alongside said portion of the other passage and separated therefrom by a wall common to said passages;
 (E) said wall having bypass ports therein coaxial with the valve members, each of which communicates the inlet passage with the outlet passage;
 (F) and a valve element on said end portion of each valve member, arranged to close its bypass port in said normal position of the valve member and to open its bypass port in said second position of the valve member.

10. The control valve of claim 9, further characterized by an injector passage in the valve body having an outlet opening to the exterior of the body and an inlet opening to one of said passages.

11. The control valve of claim 9, further characterized by:
 (A) drain passage means in the body;
 (B) each main port is communicable with said drain passage means through another valve controlled port that is closed by the associated valve member in said normal position thereof but which other valve controlled port is open to communicate the main port with the drain passage means in said second position of the associated valve member;
 (C) and other valve means controlling communication between the drain passage means and said first main port.

12. The control valve of claim 11, further characterized by:
 (A) a drain outlet in the body communicable with said drain passage means for both main ports through a branch of the drain passage means that is common to both main ports;
 (B) and said other valve means is movable with said second valve member to block communication between the first main port and the drain outlet whenever said second valve member is in its second position.

13. In a flow control device for fluid treating apparatus:
 (A) a body;
 (B) first and second valve members mounted in the body for fore and aft movement between normal and second operating positions;
 (C) means in the body defining control passages governed by each valve member, and each having a port which is normally open but which is closed by its valve member in said second operating position thereof;
 (D) wall means on the rear of the body defining
  (1) an inlet compartment which is communicable with a control passage of one of the valve members through said port thereof in the normal operating position of its valve member,
  (2) an outlet compartment which is communicable with a control passage of the other valve member through said port thereof in the normal operating position of its valve member,
  (3) said wall means comprising a partition wall member common to and separating said compartments, and shaped to dispose a portion of each compartment behind a portion of the other at a zone rearwardly of each of said valve members,
  (4) and said partition wall member having openings therethrough defining a pair of bypass ports, one for each valve member, through either of which the inlet compartment can be communicated with the outlet compartment;
 (E) a valve element on each valve member movable therewith and arranged to close the bypass port associated with its valve member only in said normal operating position thereof;
 (F) the body having an inlet for fluid to be treated opening from said inlet compartment to one side of the body;
 (G) and the body having an outlet for treated fluid opening from said outlet compartment to the opposite side of the body substantially in line with the inlet.

References Cited by the Examiner
UNITED STATES PATENTS

| | | | |
|---|---|---|---|
| 2,539,221 | 1/51 | Badeaux | 137—599.1 |
| 2,598,362 | 5/52 | Daniels | 137—599.1 |
| 2,627,873 | 2/53 | Bothe | 251—25 |
| 2,672,886 | 3/54 | Crookston | 251—25 |
| 2,744,867 | 5/56 | Webb | 210—190 X |
| 2,855,042 | 10/58 | Kryzer | 137—599.1 X |
| 3,080,975 | 3/63 | Rose | 210—191 |
| 3,109,454 | 11/63 | Whitlock | 137—599.1 |

ISADOR WEIL, *Primary Examiner.*
WILLIAM F. O'DEA, *Examiner.*